(12) United States Patent
Byun

(10) Patent No.: US 12,182,395 B2
(45) Date of Patent: Dec. 31, 2024

(54) ELECTRONIC APPARATUS, DATA STORAGE DEVICE THEREFOR, AND OPERATING METHOD THEREOF

(71) Applicant: SK hynix Inc., Icheon-si (KR)

(72) Inventor: Eu Joon Byun, Icheon-si (KR)

(73) Assignee: SK hynix Inc., Icheon-si (KR)

(*) Notice: Subject to any disclaimer, the term of this patent is extended or adjusted under 35 U.S.C. 154(b) by 48 days.

(21) Appl. No.: 18/085,449

(22) Filed: Dec. 20, 2022

(65) Prior Publication Data

US 2024/0028197 A1 Jan. 25, 2024

(30) Foreign Application Priority Data

Jul. 25, 2022 (KR) .................. 10-2022-0091909

(51) Int. Cl.
*G06F 3/06* (2006.01)

(52) U.S. Cl.
CPC .......... *G06F 3/0604* (2013.01); *G06F 3/0634* (2013.01); *G06F 3/0659* (2013.01); *G06F 3/0673* (2013.01)

(58) Field of Classification Search
CPC .... G06F 3/0604; G06F 3/0659; G06F 3/0673; G06F 3/0634; G06F 3/0679; G06F 3/0658; G06F 2212/1024

USPC ........................................................ 711/154
See application file for complete search history.

(56) References Cited

U.S. PATENT DOCUMENTS

| | | | |
|---|---|---|---|
| 7,650,481 B2 | 1/2010 | Walker | |
| 11,042,322 B2 | 6/2021 | Troy et al. | |
| 2019/0013081 A1 | 1/2019 | Blodgett et al. | |
| 2022/0019279 A1* | 1/2022 | He | G06F 1/3203 |
| 2022/0261326 A1* | 8/2022 | Byun | G11C 7/04 |

FOREIGN PATENT DOCUMENTS

| | | |
|---|---|---|
| KR | 101725691 B1 | 4/2017 |
| KR | 1020200036627 A | 4/2020 |

* cited by examiner

*Primary Examiner* — Hua J Song
(74) *Attorney, Agent, or Firm* — WILLIAM PARK & ASSOCIATES LTD.

(57) ABSTRACT

An electronic device includes an external device configured to determine a first performance index on the basis of at least one of a power level and a temperature signal, to put the first performance index into a command, and to output the command. The electronic device also includes a storage component including a plurality of memory dies. The electronic device further includes a memory controller configured to provide the temperature signal to the external device at a set transmission period, and to control the storage component to process the command by simultaneously operating the number of memory dies corresponding to the first performance index as the command is received.

24 Claims, 7 Drawing Sheets

ELECTRONIC APPARATUS, DATA STORAGE DEVICE THEREFOR, AND OPERATING METHOD THEREOF

CROSS-REFERENCES TO RELATED APPLICATION

The present application claims priority under 35 U.S.C. § 119(a) to Korean application number 10-2022-0091909, filed on Jul. 25, 2022, in the Korean Intellectual Property Office, which is incorporated herein by reference in its entirety.

BACKGROUND

1. Technical Field

The present technology relates to a semiconductor integrated device, and more particularly, to an electronic apparatus, a data storage device therefor, and an operating method thereof.

2. Related Art

An electronic apparatus including a data storage device uses a volatile or nonvolatile memory device as a storage medium, and performs data input/output operations according to an external request.

Data throughput and speed of the data storage device are improving day by day, which causes an increase in power consumption and a resultant increase in temperature.

The electronic apparatus that supplies power to an internal circuit through a battery needs to more carefully manage power consumption in order to reduce battery usage. Furthermore, a throttling function may be introduced to substantially prevent damage to the data storage device due to the temperature rise of the electronic apparatus.

The performance of the data storage device may be reduced to control battery consumption or heat generation, but service performance may deteriorate accordingly.

SUMMARY

An electronic apparatus according to an embodiment of the present technology may include: an external device configured to determine a first performance index on the basis of at least one of a power level and a temperature signal, and to output a command including the first performance index; a storage component including a plurality of memory dies; and a memory controller configured to provide the temperature signal to the external device at a set transmission period, and to control the storage component to process the command by simultaneously operating memory dies whose number corresponds to the first performance index as the command is received.

A data storage device in accordance with an embodiment of the present technology may include: a storage component including a temperature sensor and a plurality of memory dies; and a memory controller configured to provide a temperature signal based on the temperature sensor to an external device every set period in response to a mode control signal of the external device, and to control the storage component to process a command by simultaneously operating a number of memory dies corresponding to a first performance index as a command including the first performance index is received from the external device.

An operating method of a data storage device in accordance with the present disclosure may include: receiving, by a memory controller configured to control a storage component including a temperature sensor, a mode control signal from an external device; transmitting, by the memory controller, a temperature signal based on the temperature sensor to the external device every set period; and controlling, by the memory controller, the storage component to process a command by simultaneously operating a number of memory dies corresponding to a first performance index as the command including the first performance index is received from the external device.

DETAILED DESCRIPTION

Hereinafter, embodiments of the present technology will be described in more detail with reference to the accompanying drawings.

Figure 1:
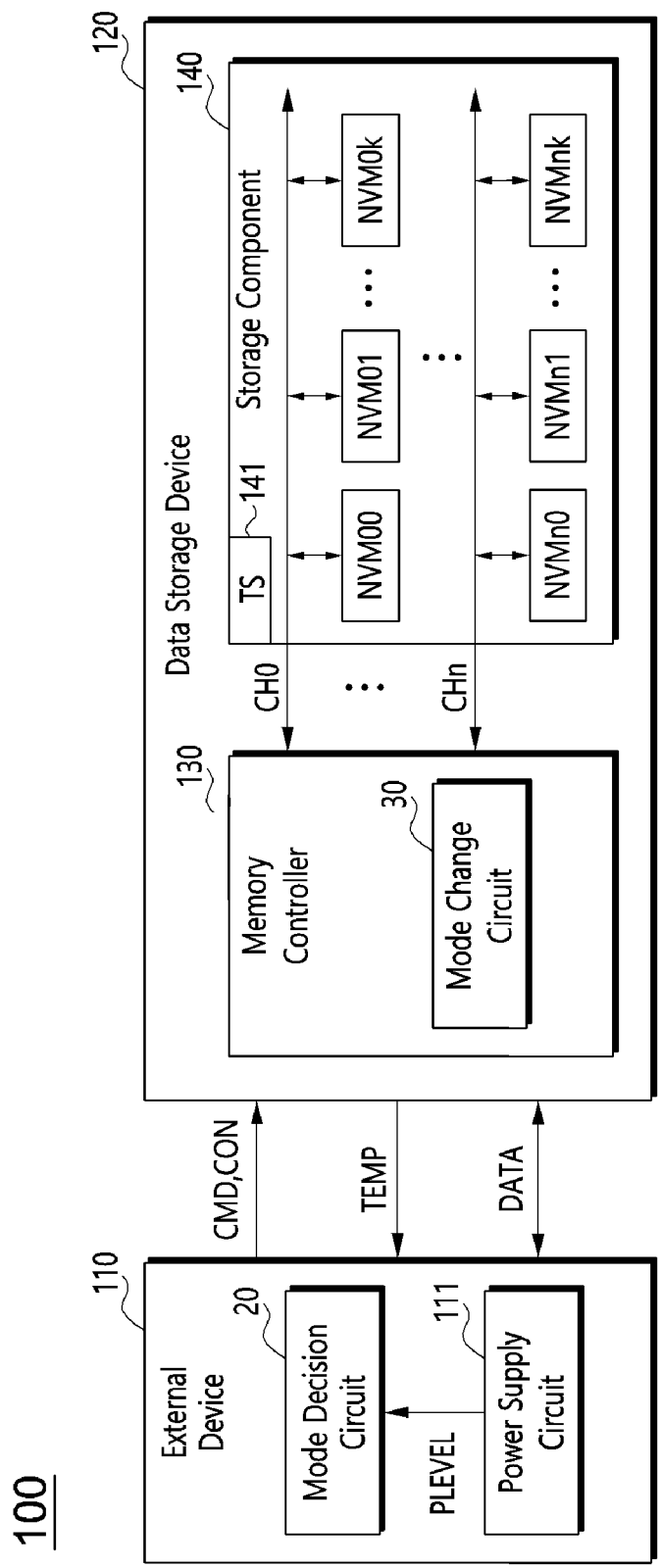
FIG. 1 is a configuration diagram of an electronic apparatus in accordance with an embodiment.

FIG. 1 is a configuration diagram of an electronic apparatus 100 in accordance with an embodiment.

Referring to FIG. 1, the electronic apparatus 100 may include an External Device 110 and a Data Storage Device 120.

The External Device 110 may transmit a command CMD and a control signal CON to the Data Storage Device 120, and receive a temperature signal TEMP from the Data Storage Device 120. The External Device 110 and the Data Storage Device 120 may transmit/receive data DATA.

The External Device 110 may be selected from, for example, portable devices such as mobile phones and MP3 players, personal devices such as laptop computers, desktop computers, game machines, televisions, and beam projectors, or devices for processing large-capacity data such as workstations or servers. The External Device 110 may serve as a host device with respect to the Data Storage Device 120.

The Data Storage Device 120 is configured to operate in response to the command CMD and the control signal CON from the External Device 110. The Data Storage Device 120 is configured to store the data DATA accessed by the External Device 110. That is, the Data Storage Device 120 may be used as a main storage device or an auxiliary storage device of the External Device 110. The Data Storage Device 120 may include a Memory Controller 130 and a Storage Component 140. The Data Storage Device 120 may be configured as a memory card connected to the External Device 110 through various interfaces. In an embodiment, the Data Storage Device 120 may be configured as a solid state drive (SSD).

The Memory Controller 130 is configured to control the Storage Component 140 in response to the command CMD and the control signal CON from the External Device 110. For example, the Memory Controller 130 is configured to store the data DATA provided from the External Device 110 in the Storage Component 140 or provide the External Device 110 with data read from the Storage Component 140.

For such an operation, the Memory Controller 130 is configured to control read, program (or write), and erase operations on the Storage Component 140.

Although not illustrated in the drawing, the Data Storage Device 120 may include a buffer memory device provided inside or outside the Memory Controller 130. The buffer memory device may serve as a space for temporarily storing data when the Data Storage Device 120 inputs and outputs data in cooperation with the External Device 110.

The Storage Component 140 may be connected to the Memory Controller 130 through one or more channels CH0 to CHn, and may include one or more nonvolatile memory devices NVM00 to NVM0k and NVMn0 to NVMnk connected to the respective channels CH0 to CHn. In an embodiment, each of the nonvolatile memory devices NVM00 to NVM0k and NVMn0 to NVMnk may be configured as at least one of various types of nonvolatile memory devices such as a NAND flash memory device, a NOR flash memory device, a ferroelectric random access memory (FRAM) using a ferroelectric capacitor, a magnetic RAM (MRAM) using a tunneling magneto-resistive (TMR) film, a phase change RAM (PRAM) using chalcogenide alloys, and a resistive RAM (RERAM) using a transition metal oxide.

Each of the nonvolatile memory devices NVM00 to NVM0k and NVMn0 to NVMnk may include at least one memory die including a plurality of memory cells connected between a plurality of word lines and bit lines. Each of the memory cells may operate as a single-level cell (SLC) capable of storing one bit of data or a multi-level cell (MLC) capable of storing two bits or more of data.

Each of the nonvolatile memory devices NVM00 to NVM0k and NVMn0 to NVMnk may be configured to operate as a single-level cell (SLC) memory device or as a multi-level cell (MLC) memory device. Alternatively, among the nonvolatile memory devices NVM00 to NVM0k and NVMn0 to NVMnk, some may be configured to operate as single-level cell (SLC) memory devices or the others may be configured to operate as multi-level cell (MLC) memory devices.

A group of memory cells connected to substantially the same word line among the memory cells constituting the nonvolatile memory devices NVM00 to NVM0k and NVMn0 to NVMnk may be referred to as a page. A set of a plurality of pages may constitute a memory block, and at least one memory block may be selected from each of a plurality of dies, which are connected to substantially the same channel, to constitute a super block. A set of pages connected to the same or different word lines included in one super block may constitute a stripe (or super page). The Storage Component 140 may program or read data in units of pages or stripes, and may erase data in units of memory blocks.

The Storage Component 140 may include a temperature sensor (TS) 141, and may provide a temperature detection signal of the Storage Component 140 to the Memory Controller 130. The Memory Controller 130 may transmit a temperature signal TEMP generated based on the temperature sensing signal to the External Device 110.

The External Device 110 may include a Power Supply Circuit 111 and provide power supplied from the Power Supply Circuit 111 to the Data Storage Device 120. That is, the Data Storage Device 120 may operate by receiving power from the External Device 110. The Power Supply Circuit 111 may include a rechargeable battery, that is, a battery.

The electronic device 100 in accordance with an embodiment of the present technology may control battery usage and heat generation, and to this end, may control the performance of the Data Storage Device 120 in various ways. To control the performance of the Data Storage Device 120, the External Device 110 may include a Mode Decision Circuit 20, and the Memory Controller 130 may include a Mode Change Circuit 30.

In an embodiment, the performance of the Data Storage Device 120 may be adjusted by changing an interleaving index.

The Storage Component 140 including a plurality of dies may operate in an interleaving manner. The interleaving manner may be an operation of processing a command from the External Device 110 by simultaneously accessing a plurality of memory chips or dies connected to substantially the same channel. The interleaving index is the number of dies determined to be simultaneously operated when the Data Storage Device 120 operates in an interleaving manner.

Figure 2:
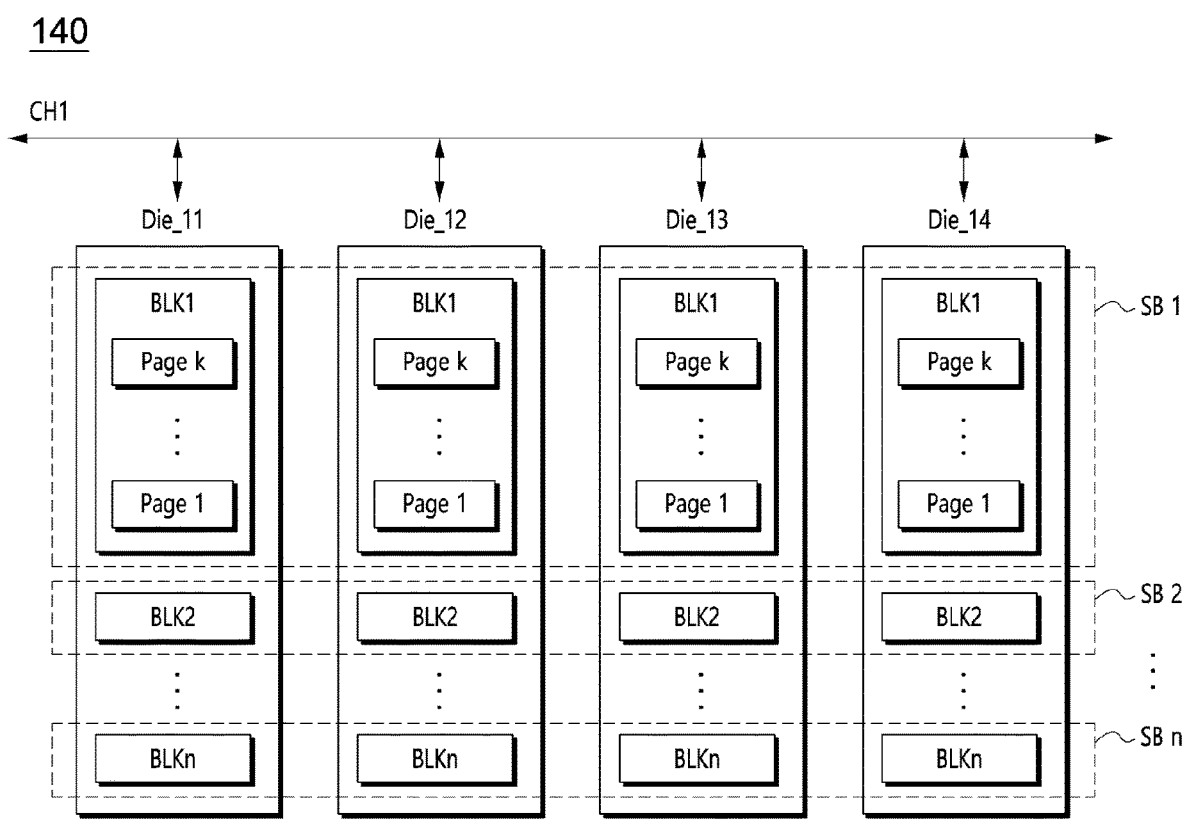
FIG. 2 is a configuration diagram of a storage component in accordance with an embodiment.

FIG. 2 is a configuration diagram of the Storage Component 140 in accordance with an embodiment.

Referring to FIG. 2, a plurality of dies Die_11 to Die_14 may be connected in common to a first channel CH1.

Each of the dies Die_11 to Die_14 may include a plurality of planes, but for convenience of description, FIG. 2 illustrates that one die includes one plane.

One plane may include a plurality of memory blocks BLK1 to BLKn (n is a natural number equal to or greater than 1), and one memory block may include a plurality of pages Page 1 to Page k (k is a natural number equal to or greater than 1).

The Memory Controller 130 may control the memory blocks BLK1 to BLKn, which are included in each of the plurality of dies Die_11 to Die_14 connected in common to one channel, in units of super blocks SB1 to SBn. That is, the super blocks SB1 to SBn may include at least two or more memory blocks included in different dies of a common channel.

For example, first memory blocks BLK1 included in the respective dies Die_11 to Die_14 may constitute a first super block SB 1. Second memory blocks BLK2 included in the respective dies Die_11 to Die_14 may constitute a second super block SB 2. In the same manner, $n^{th}$ memory blocks BLKn included in the respective dies Die_11 to Die_14 may constitute an $n^{th}$ super block SB n.

For data interleaving, the Memory Controller 130 may simultaneously select a plurality of dies connected to substantially the same channel and input/output data in parallel. For example, the Memory Controller 130 may transmit a control signal, which includes a command and an address, and data to an eleventh die Die_11 through the first channel CH1. While the eleventh die Die_11 programs the received data to a memory cell included therein, the Memory Controller 130 may transmit a control signal, which includes a command and an address, and data to a twelfth die Die_12.

The greater the number of channels, the greater the number of dies simultaneously operating, that is, the higher the interleaving index, the higher the interleaving efficiency, and thus the performance of the Data Storage Device 120 may be excellent, but power consumption or heat generation may increase.

The electronic device 100 in accordance with an embodiment may adjust the interleaving index, that is, data processing performance, adaptively to the battery state and heat generation state of the electronic device 100.

In an embodiment, the Mode Decision Circuit 20 may select a performance mode of the Data Storage Device 120 from a first mode, a second mode, or a third mode. When the performance mode is determined as the second mode or the third mode, the Mode Decision Circuit 20 may determine a performance index, which is the number of memory dies to be simultaneously operated, on the basis of at least one of a power level signal PLEVEL and the temperature signal TEMP.

In an embodiment, the first mode may be a time-based performance control mode for adjusting the performance of the Data Storage Device 120 for a specific time period. The second mode may be a command-based performance control mode for adjusting the performance of the Data Storage Device 120 in units of commands. The third mode may be a mixed performance control mode in which is the first mode and the second mode are mixed. The performance mode may be determined by a user or operator of the electronic device 100 or may be determined by the External Device 110 among at least the first to third modes on the basis of a predefined rule or method.

After the performance mode is determined, the Mode Decision Circuit 20 may generate metadata corresponding to the determined performance mode. The Mode Decision Circuit 20 may transmit a mode control signal including a mode identifier indicating the determined performance mode and the meta data to the Data Storage Device 120. In an embodiment, the External Device 110 may put the mode control signal into at least one of the control signal CON and the command CMD and transmit the mode control signal including the at least one.

In an embodiment, metadata corresponding to the first mode is time-based control information, and may include mode change start time, mode change end time, performance index, and exception time control information. The exception time control information may include a performance index for an exceptional time other than or alternate to the time indicated by the time-based control information.

Metadata corresponding to the second mode is command-based control information and may include a temperature signal TEMP transmission period.

Metadata corresponding to the third mode may include time-based control information, command-based control information, and exception time control information. The exception time control information may include performance control information on the exceptional time other than the time indicated by the time-based control information. The Mode Decision Circuit 20 may generate the exception time control information so that the Data Storage Device 120 operates with a specific performance index or operates in the second mode during the exceptional time. The exceptional time, for example, may be a time interval or time period.

When the performance mode is determined as the first mode, the Mode Decision Circuit 20 may consider a mode control signal including a performance index as a kind of control signal CON and transmit the mode control signal to the Data Storage Device 120.

When the performance mode is determined as the second mode or the third mode, the Mode Decision Circuit 20 may consider a mode control signal excluding a performance index as a kind of control signal CON and transmit the mode control signal to the Data Storage Device 120, put the performance index into the command CMD, and transmit the command CMD including the performance index to the Data Storage Device 120.

In an embodiment, in a case where the performance mode is determined as the second mode or the third mode, when needing to transmit a command to the Data Storage Device 120, the Mode Decision Circuit 20 may determine a performance index on the basis of at least one of the power level signal PLEVEL and the temperature signal TEMP. The Mode Decision Circuit 20 may generate a command to include the determined performance index and transmit the generated command to the Data Storage Device 120.

According to implementation, the External Device 110 may store, as a lookup table, a performance index corresponding to the power level signal PLEVEL and/or the temperature signal TEMP, and the Mode Decision Circuit 20 may periodically check the power level signal PLEVEL and the temperature signal TEMP and determine a corresponding performance index.

The Mode Change Circuit 30 of the Memory Controller 130 may determine a performance mode on the basis of the mode identifier included in the mode control signal, and operate the Storage Component 140 according to the metadata of the mode control signal or the performance index included in the command CMD.

When the performance mode is determined as the first mode, the Mode Change Circuit 30 may control the Storage Component 140 to operate with a corresponding performance index from the mode change start time to the mode change end time. During the exceptional time other than the time indicated by the time-based control information, the Mode Change Circuit 30 may control the Storage Component 140 to operate with a performance index indicated by the exception time control information.

When the performance mode is determined as the second mode, the Mode Change Circuit 30 may transmit the temperature signal TEMP to the External Device 110 according to the temperature signal TEMP transmission period, and control the Storage Component 140 by extracting the performance index from the command CMD transmitted from the External Device 110.

When the performance mode is determined as the third mode, the Mode Change Circuit 30 may control the Storage Component 140 to operate with the time-based performance index from the mode change start time to the mode change end time while controlling the Storage Component 140 on the basis of the command-based performance index extracted from the command transmitted from the External Device 110 during this time. During the exceptional time, the Mode Change Circuit 30 may control the Storage Component 140 to operate with the performance index corresponding to the exception time control information or to operate in the second mode.

When the performance of the Data Storage Device 120 is controlled in the second mode or the third mode, the number of memory dies simultaneously operating may be adjusted by determining a performance index according to a battery level and temperature. Data processing performance may be adjusted to be suitable for the battery level and heat generation state of the electronic device 100, so that service quality adaptive to the state of the electronic device 100 may be provided.

Figure 3:
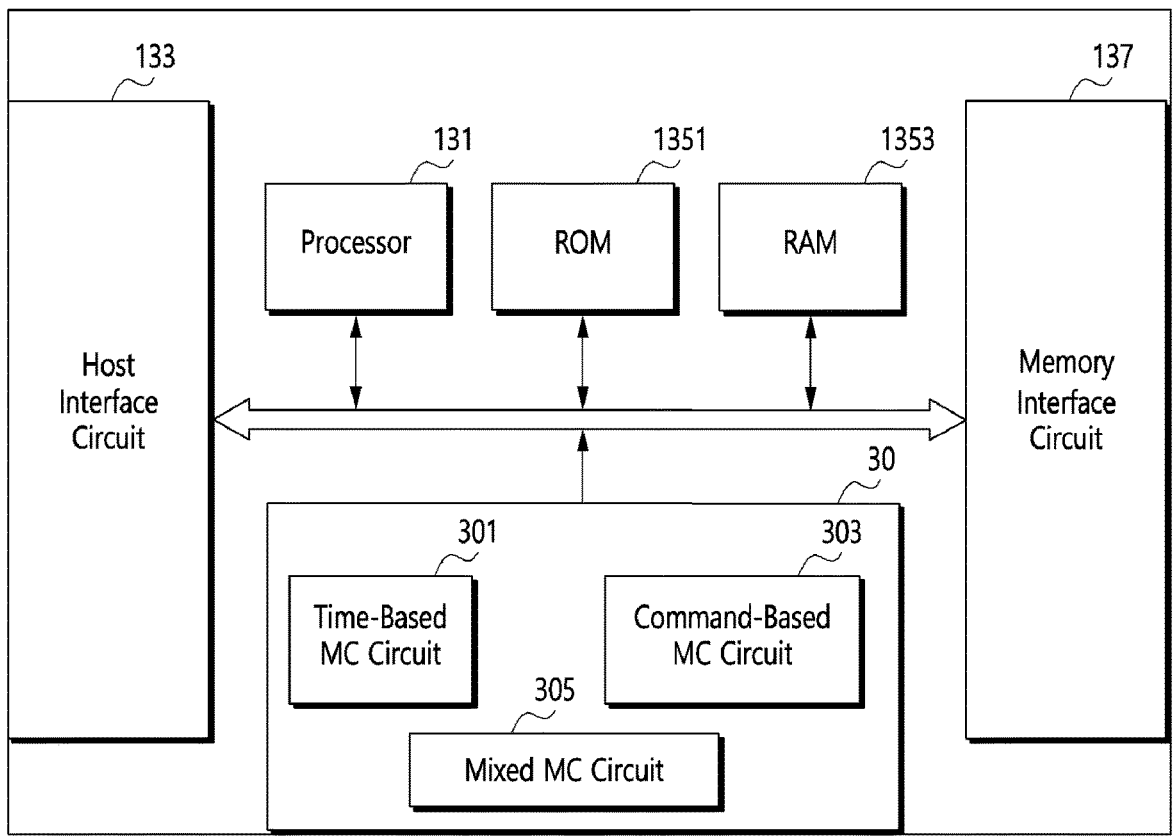
FIG. 3 is a configuration diagram of a memory controller in accordance with an embodiment.

FIG. 3 is a configuration diagram of the Memory Controller 130 in accordance with an embodiment.

Referring to FIG. 3, the Memory Controller 130 may include a processor Processor 131, a host interface circuit Host Interface Circuit 133, ROM 1351, RAM 1353, a memory interface circuit Memory Interface Circuit 137, and the Mode Change Circuit 30.

The Processor 131 may be configured to transmit various control information necessary for a data read or write operation on the Storage Component 140 to the Host Interface Circuit 133, the RAM 1353, the Memory Interface Circuit 137, and the Mode Change Circuit 30. In an embodiment, the Processor 131 may operate according to firmware provided for various operations of the Data Storage Device 120. In an embodiment, the Processor 131 may perform functions of a flash translation layer (FTL) for managing the Storage Component 140, for example, garbage collection, address mapping, wear leveling, and the like. The Processor 131 may be a combination of hardware and software operating on the hardware.

The Host Interface Circuit 133 may be an external device interface circuit. The Host Interface Circuit 133 may provide a communication channel for receiving commands and clock signals from the External Device 110, and controlling data input/output under the control of the Processor 131. Particularly, the Host Interface Circuit 133 may provide a physical connection between the external device 110 and the Data Storage Device 120. The Host Interface Circuit 133 may also provide interfacing with the Data Storage Device 120 in correspondence to a bus format of the external device 110. The bus format of the external device 110 may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and a universal flash storage (UFS).

The ROM 1351 may store program codes necessary for the operation of the Memory Controller 130, for example, firmware or software, and store code data and the like used by the program codes.

The RAM 1353 may store data necessary for the operation of the Memory Controller 130 or data generated by the Memory Controller 130. The RAM 1353 may include, for example, SRAM, and may be used as buffer memory, working memory, or cache memory of the Memory Controller 130.

The Memory Interface Circuit 137 may provide a communication channel for signal transmission/reception between the Memory Controller 130 and the Storage Component 140. The Memory Interface Circuit 137 may exchange data with the Storage Component 140 under the control of the Processor 131.

The Mode Change Circuit 30 may determine the performance mode of the Data Storage Device 120 in response to the mode control signal transmitted from the External Device 110. The Mode Change Circuit 30 may change the performance of the Data Storage Device 120 on the basis of the metadata and the performance index included in the mode control signal or the command.

In an embodiment, the Mode Change Circuit 30 may include a time-based mode change circuit Time-Based MC Circuit 301, a command-based mode change circuit Command-Based MC Circuit 303, and a mixed mode change circuit Mixed MC Circuit 305.

When the performance mode is determined as the first mode, the Time-Based MC Circuit 301 may extract the time-based control information, that is, the mode change start time, the mode change end time, the performance index, and the exception time control information, from the metadata included in the mode control signal. Then, the Time-Based MC Circuit 301 may control the Storage Component 140 to operate with a performance index corresponding to each of a time-based performance control section from the mode change start time to the mode change end time and the exceptional time.

When the performance mode is determined as the second mode, the Command-Based MC Circuit 303 may extract the command-based control information, that is, the temperature signal (TEMP) transmission period, from the metadata included in the mode control signal, and transmit the temperature signal TEMP to the External Device 110 every corresponding period. When the command CMD is transmitted from the External Device 110 in a state in which the performance mode is set as the second mode, the Command-Based MC Circuit 303 may operate the Storage Component 140 according to the performance index included in the command CMD.

When the performance mode is determined as the third mode, the Mixed MC Circuit 305 may extract the time-based control information, the command-based control information, and the exception time control information from the metadata included in the mode control signal. The time-based control information may include the mode change start time, the mode change end time, and the performance index, and the command-based control information may include the temperature signal (TEMP) transmission period. The exception time control information may include performance control information on the exceptional time other than the time indicated by the time-based control information. The exception time control information may include information for instructing the Data Storage Device 120 to operate with a performance index or in the second mode.

The Mixed MC Circuit 305 may control the Storage Component 140 to operate with the time-based performance index from the mode change start time to the mode change end time, that is, during the time-based performance control section. The mixed mode change circuit 305 may transmit the temperature signal TEMP to the External Device 110 at a period included in the command-based control information during the time-based performance control section. When the command CMD is transmitted from the External Device 110 during the time-based performance control section, the Mixed MC Circuit 305 may control the Storage Component 140 to operate according to the performance index included in the command CMD. The Mixed MC Circuit 305 may control the Storage Component 140 to operate with the performance index corresponding to the exception time control information or to operate in the second mode during the exceptional time other than the time-based performance control section.

As described above, according to the present technology, the performance of the Data Storage Device 120 may be adjusted according to a battery level and a heat generation state. Accordingly, it is possible to prevent the Data Storage Device 120 from operating with high performance or unnecessarily low performance without considering the battery and heat generation level.

FIG. 4 to FIG. 7 are flowcharts for describing an operating method of the Data Storage Device 120 in accordance with an embodiment.

Figure 4:
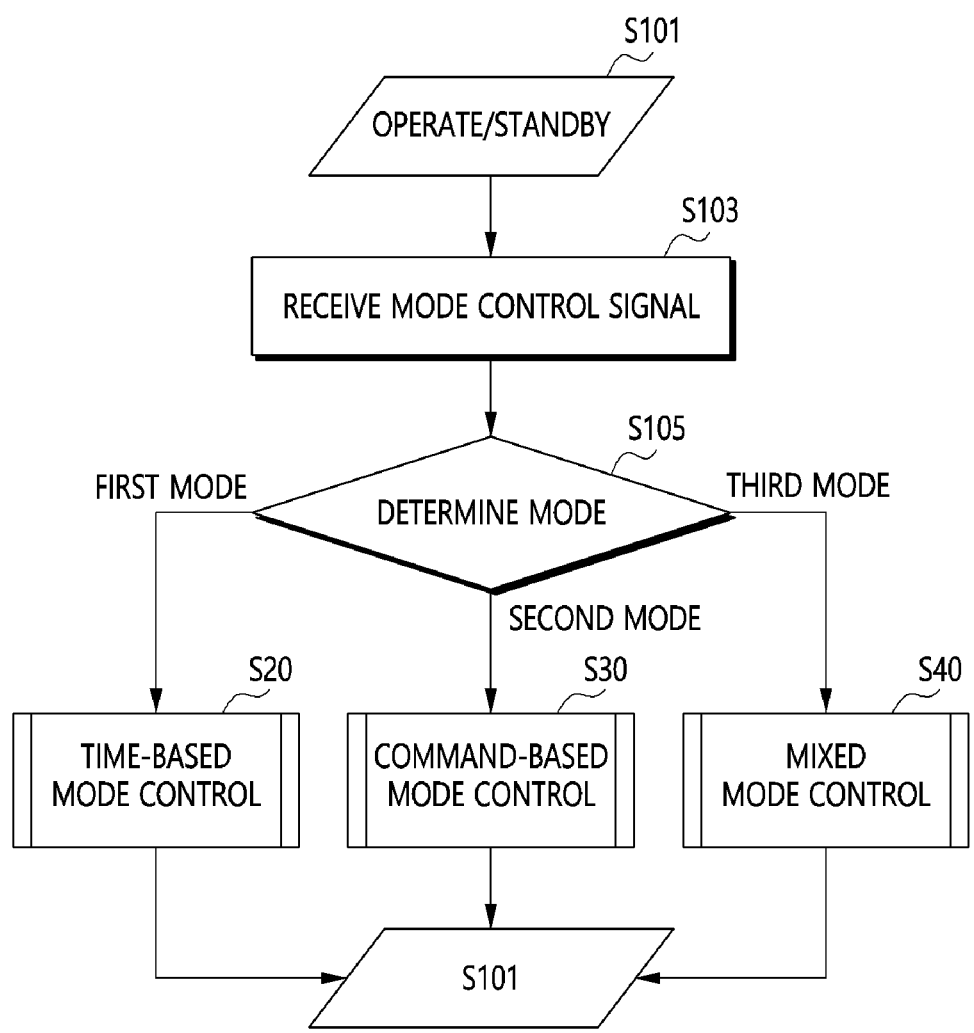
FIG. 4 to FIG. 7 are flowcharts for describing an operating method of a data storage device in accordance with an embodiment.

FIG. 4 is a flowchart for describing the operating method of the Data Storage Device 120 for each performance mode in accordance with an embodiment.

Referring to FIG. 4, during operation or stand-by in the background or foreground (S101), the Memory Controller 130 of the Data Storage Device 120 may receive the mode control signal from the External Device 110 (S103).

The Memory Controller 130 may determine the performance mode of the Data Storage Device 120, actually the Storage Component 140, on the basis of the mode identifier included in the mode control signal (S105).

When the performance mode is determined as the first mode (S105: first mode), the Memory Controller 130 may perform a time-based mode control procedure (S20) of operating the Storage Component 140 with a performance index presented by the External Device 110 during the time-based performance control section.

When the performance mode is determined as the second mode (S105: second mode), the Memory Controller 130 may perform a command-based mode control procedure (S30) of transmitting the temperature signal TEMP to the External Device 110 every set period and operating the Storage Component 140 according to the performance index included in the command CMD transmitted from the External Device 110.

When the performance mode is determined as the third mode (S105: third mode), the Memory Controller 130 may perform a mixed mode control procedure (S40) of controlling the Storage Component 140 according to the time-based performance control mode and the command-based performance control mode during the time-based performance control section, and controlling the Storage Component 140 to operate with a performance index corresponding to the exception time control information or operate in the second mode during the exceptional time.

Figure 5:
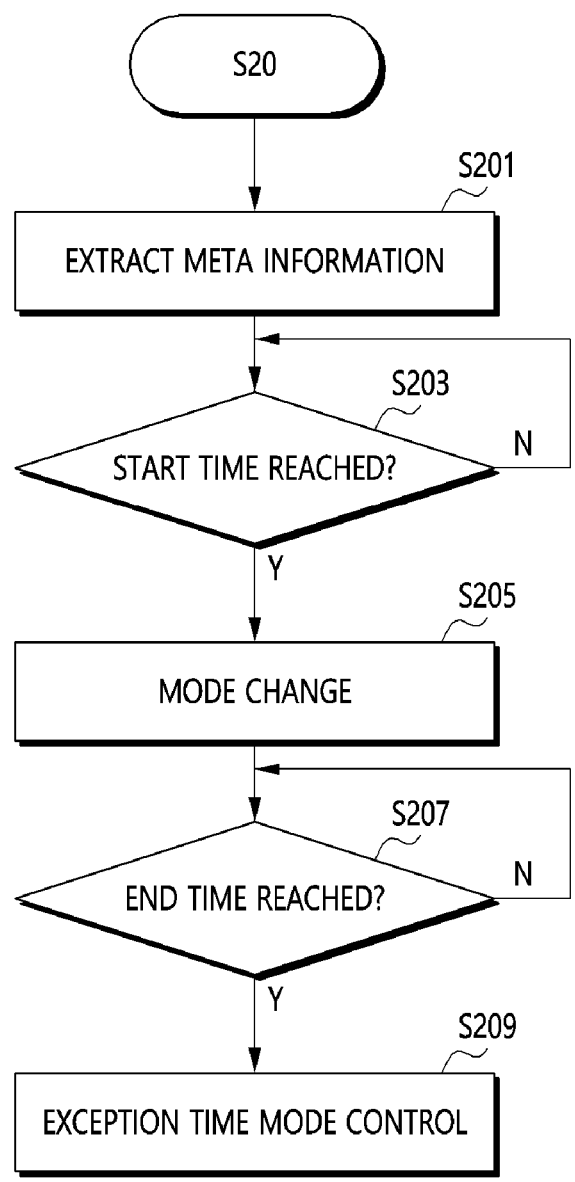

FIG. 5 is a flowchart for describing the time-based mode control procedure (S20) in accordance with an embodiment.

When desiring to control the performance of the Data Storage Device 120 in the first mode, the External Device 110 may put the time-based control information including the mode change start time, the mode change end time, the performance index, and the exception time control information into meta information, and transmit the mode control signal to the Data Storage Device 120. In an embodiment, the External Device 110 may process the mode control signal as a kind of control signal CON and transmit the processed mode control signal to the Data Storage Device 120.

The Memory Controller 130 of the Data Storage Device 120 may extract the meta information including the mode change start time, the mode change end time, the performance index, and the exception time control information from the mode control signal (S201).

The Memory Controller 130 may check whether the mode change start time extracted in step S201 has been reached (S203 and S203: N). When the mode change start time has been reached (S203: Y), the Memory Controller 130 may change the operation mode of the Storage Component 140 according to the performance index extracted in step S201 (S205). The Storage Component 140 may operate in the operation mode changed in step S205, that is, with the performance index.

After the mode change, the Memory Controller 130 may check whether the mode change end time extracted in step S201 has been reached (S207 and S207: N). When the mode change end time has been reached (S207: Y), the Memory Controller 130 may control the performance of the Data Storage Device 120 with the performance index indicated by the exception time control information on the exceptional time other than the time-based performance control section (S209).

Figure 6:
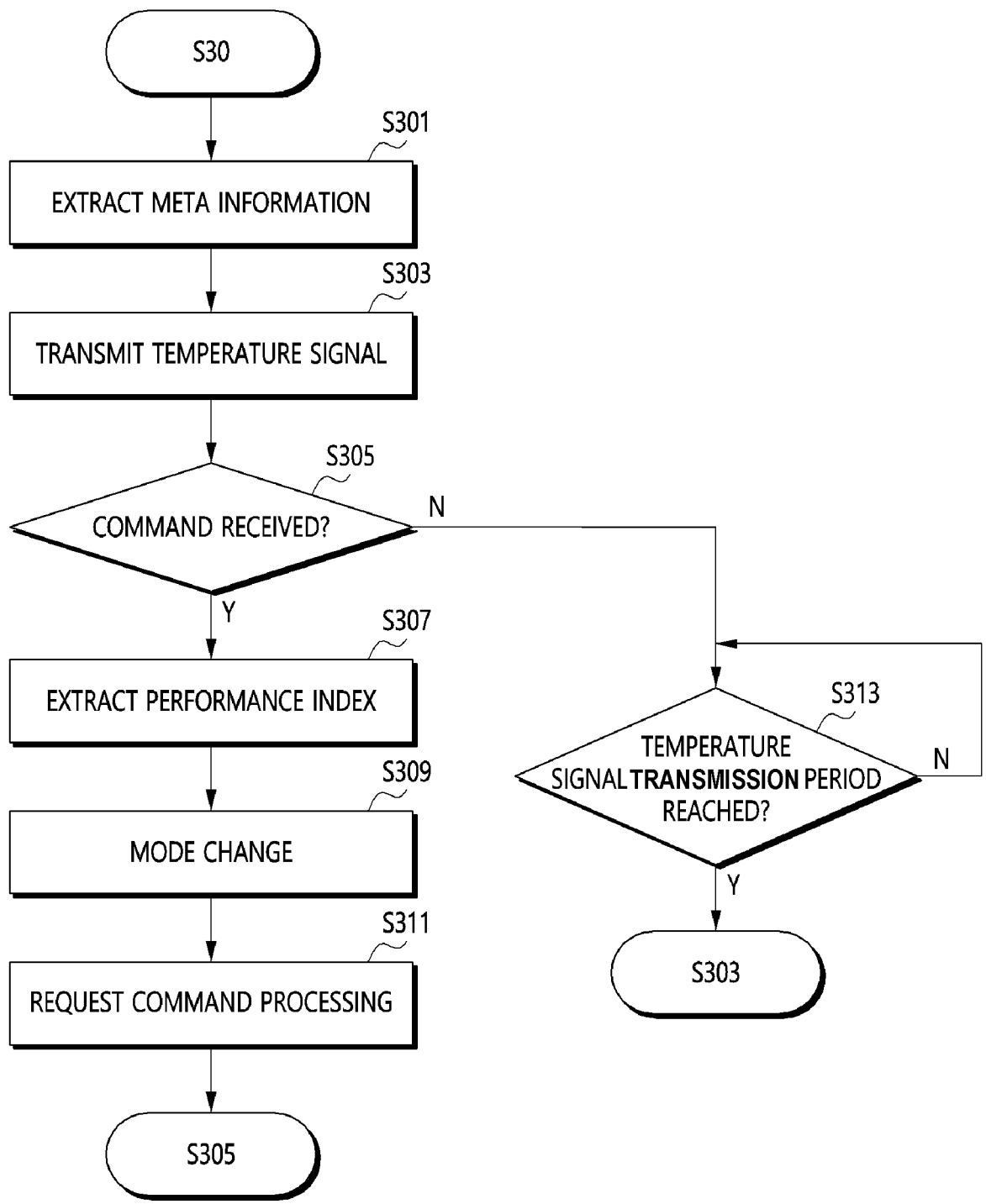

FIG. 6 is a flowchart for describing the command-based mode control procedure S30 in accordance with an embodiment.

When desiring to control the performance of the Data Storage Device 120 in the second mode, the External Device 110 may put the command-based control information including the temperature signal (TEMP) transmission period into meta information, and transmit the mode control signal to the Data Storage Device 120. In an embodiment, the External Device 110 may process the mode control signal as a kind of control signal CON and transmit the processed mode control signal to the Data Storage Device 120.

The Memory Controller 130 of the Data Storage Device 120 may extract the meta information including the temperature signal (TEMP) transmission period from the mode control signal (S301), and transmit the temperature signal TEMP to the External Device 110 (S303).

When needing to transmit the command CMD to the Data Storage Device 120, the External Device 110 may generate the command CMD to include a performance index determined on the basis of at least one of the power level signal PLEVEL and the temperature signal TEMP, and transmit the command CMD to the Data Storage Device 120.

According to implementation, the External Device 110 may store, as a lookup table, a performance index corresponding to the power level signal PLEVEL and/or the temperature signal TEMP, and the Mode Decision Circuit 20 may periodically check the power level signal PLEVEL and the temperature signal TEMP and determine a corresponding performance index.

The Memory Controller 130 may check whether the command CMD is received from the External Device 110 (S305). When the command CMD is received from the External Device 110 (S305: Y), the Memory Controller 130 may extract the performance index included in the command CMD (S307), and change the operation mode of the Storage Component 140 according to the extracted performance index (S309).

The Memory Controller 130 may transmit the command CMD received from the External Device 110 to the Storage Component 140 and request the Storage Component 140 to process the command CMD (S311), and check whether the command CMD is subsequently received from the External Device 110 (S305).

The Storage Component 140 may process the command CMD in the operation mode changed in step S309, that is, with the performance index.

When the command CMD is not received from the External Device 110 (S305: N), the Memory Controller 130 may check whether the temperature signal TEMP transmission period has been reached (S313 and S313: N). When the temperature signal TEMP transmission period has been reached (S313: Y), the Memory Controller 130 may transmit the temperature signal (S303) and perform a subsequent process.

Figure 7:
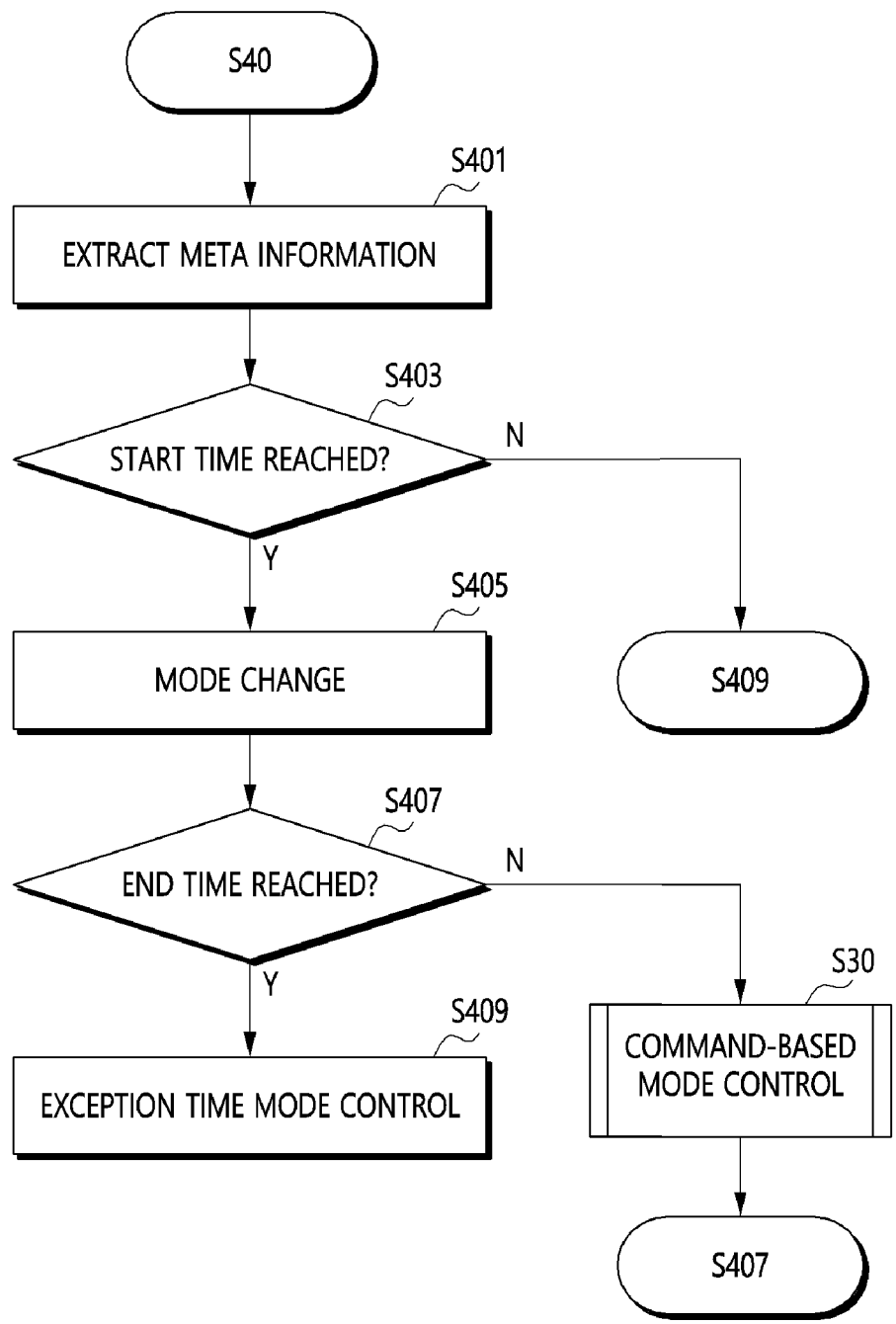

FIG. 7 is a flowchart for describing the mixed mode control procedure (S40) in accordance with an embodiment.

When desiring to control the performance of the Data Storage Device 120 in the third mode, the External Device 110 may put the time-based control information, the command-based control information, and the exception time control information into meta information, and transmit the mode control signal to the Data Storage Device 120. In an embodiment, the External Device 110 may process the mode control signal as a kind of control signal CON and transmit the processed mode control signal to the Data Storage Device 120.

In an embodiment, the time-based control information may include the mode change start time, the mode change end time, and the performance index. The command-based control information may include the temperature signal (TEMP) transmission period. The exception time control information may include the performance control information on the exceptional time other than the time indicated by the time-based control information, for example, information for instructing the Data Storage Device 120 to operate with a performance index or in the second mode.

The Memory Controller 130 of the Data Storage Device 120 may extract the meta information including the time-based control information, the command-based control information, and the exception time control information from the mode control signal (S401).

The Memory Controller 130 of the Data Storage Device 120 may check whether the mode change start time extracted in step S401 has reached (S403). When the mode change start time has reached (S403: Y), the Memory Controller 130 may change the operation mode of the Storage Component 140 according to the performance index extracted in step S401 (S405). The Storage Component 140 may operate in the operation mode changed in step S405, that is, with the performance index.

When the mode change start time has not been reached (S403: N), the Memory Controller 130 may control the performance of the Storage Component 140 with the performance index indicated by the exception time control information extracted in step S401 or in the second mode (S409).

After the mode change in step S405, the Memory Controller 130 may check whether the mode change end time extracted in step S401 has been reached (S407). When the mode change end time has been reached (S407: Y), the Memory Controller 130 may control the performance of the Storage Component 140 with the performance index indicated by the exception time control information extracted in step S401 or in the second mode (S409).

When the mode change end time has not been reached (S407: N), the Memory Controller 130 may control the performance of the Storage Component 140 in the second mode, that is, the command-based control mode (S30). Because the command-based mode control procedure S30 has been described above with reference to FIG. 6, a detailed description thereof is omitted.

While performing the command-based mode control (S30), the Memory Controller 130 may check whether the mode change end time has reached (S407).

According to the present technology, when the performance of the Data Storage Device 120 is controlled in the second mode or the third mode, data processing performance may be adjusted to be suitable for the battery level and heat generation state of the electronic device 100, so that service quality adaptive to the state of the electronic device 100 may be provided.

A person skilled in the art to which the present disclosure pertains will understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. An electronic device comprising:
    an external device configured to determine a first performance index on the basis of at least one of a power level and a temperature signal, and to output a command including the first performance index;
    a storage component including a plurality of memory dies; and
    a memory controller configured to provide the temperature signal to the external device at a set transmission period, and to control the storage component to process the command by simultaneously operating memory dies whose number corresponds to the first performance index as the command is received,
    wherein the external device is configured to transmit a mode control signal including a start time, an end time and a second performance index to the memory controller, and
    the memory controller is configured to control the storage component to process the command by simultaneously operating a number of memory dies corresponding to the second performance index during a time interval from the start time to the end time.

2. The electronic device according to claim 1, wherein the external device is configured to transmit the mode control signal including the transmission period to the memory controller.

3. The electronic device according to claim 1, wherein the mode control signal further comprises a first exception time control information.

4. The electronic device according to claim 3, wherein the first exception time control information includes a third performance index for an exceptional time other than the time interval, and
    the memory controller is configured to control the storage component to process the command by simultaneously operating a number of memory dies corresponding to the third performance index during the exceptional time.

5. The electronic device according to claim 1, wherein the mode control signal comprises time-based control information including the start time, the end time, and the second performance index, command-based control information including the transmission period, and second exception time control information.

6. The electronic device according to claim 5, wherein the memory controller is configured to control the storage component to process the command by simultaneously operating a number of memory dies corresponding to the first performance index or the second performance index according to whether the command is received from the external device during a time interval from the start time to the end time.

7. The electronic device according to claim 5, wherein the second exception time control information includes a third performance index for an exceptional time other than a time interval from the start time to the end time, and
    the memory controller is configured to control the storage component to process the command by simultaneously operating a number of memory dies corresponding to the third performance index during the exceptional time.

8. The electronic device according to claim 5, wherein the second exception time control information includes a transmission period for an exceptional time other than a time interval from the start time to the end time.

9. A data storage device comprising:
    a storage component including a temperature sensor and a plurality of memory dies; and
    a memory controller configured to provide a temperature signal based on the temperature sensor to an external device every set period in response to a mode control signal of the external device, and to control the storage component to process a command by simultaneously operating a number of memory dies corresponding to a first performance index as the command including the first performance index is received from the external device, wherein the external device is configured to transmit a mode control signal including a start time, an end time and a second performance index to the memory controller, and the memory controller is configured to control the storage component to process the command by simultaneously operating a number of memory dies corresponding to the second performance index during a time interval from the start time to the end time.

10. The data storage device according to claim 9, wherein the mode control signal includes the transmission period.

11. The data storage device according to claim 9, wherein the mode control signal further comprises first exception time control information.

12. The data storage device according to claim 11, wherein the first exception time control information includes a third performance index for an exceptional time other than the time interval, and the memory controller is configured to control the storage component to process the command by simultaneously operating a number of memory dies corresponding to the third performance index during the exceptional time.

13. The data storage device according to claim 9, wherein the mode control signal comprises time-based control information including the start time, the end time, and the second performance index, command-based control information including the transmission period, and second exception time control information.

14. The data storage device according to claim 13, wherein the memory controller is configured to control the storage component to process the command by simultaneously operating the number of memory dies corresponding to the first performance index or a number of dies corresponding to the second performance index according to whether the command is received from the external device during a time interval from the start time to the end time.

15. The data storage device according to claim 13, wherein the second exception time control information includes a third performance index for an exceptional time other than a time interval from the start time to the end time, and the memory controller is configured to control the storage component to process the command by simultaneously operating a number of memory dies corresponding to the third performance index during the exceptional time.

16. The data storage device according to claim 13, wherein the second exception time control information includes a transmission period for an exceptional time other than a time interval from the start time to the end time.

17. An operating method of a data storage device, the operating method comprising:

receiving, by a memory controller configured to control a storage component including a temperature sensor, a mode control signal from an external device;

transmitting, by the memory controller, a temperature signal based on the temperature sensor to the external device every set period; and controlling, by the memory controller, the storage component to process a command by simultaneously operating a number of memory dies corresponding to a first performance index as the command including the first performance index is received from the external device, wherein the external device is configured to transmit a mode control signal including a start time, an end time and a second performance index to the memory controller, and the memory controller is configured to control the storage component to process the command by simultaneously operating a number of memory dies corresponding to the second performance index during a time interval from the start time to the end time.

18. The operating method according to claim 17, wherein the mode control signal includes the transmission period.

19. The operating method according to claim 17, wherein the mode control signal further comprises first exception time control information.

20. The operating method according to claim 19, wherein the first exception time control information includes a third performance index for an exceptional time other than the time interval, and the operating method further comprises:

controlling, by the memory controller, the storage component to process the command by simultaneously operating a number of memory dies corresponding to the third performance index during the exceptional time.

21. The operating method according to claim 17, wherein the mode control signal comprises time-based control information including the start time, the end time, and the second performance index, command-based control information including the transmission period, and second exception time control information.

22. The operating method according to claim 21, further comprising:

controlling, by the memory controller, the storage component to process the command by simultaneously operating the number of memory dies corresponding to the first performance index or a number of memory dies corresponding to the second performance index according to whether the command is received from the external device during a time interval from the start time to the end time.

23. The operating method according to claim 21, wherein the second exception time control information includes a third performance index for an exceptional time other than a time interval from the start time to the end time, and the operating method further comprises:

controlling, by the memory controller, the storage component to process the command by simultaneously operating a number of memory dies corresponding to the third performance index during the exceptional time.

24. The operating method according to claim 21, wherein the second exception time control information includes a transmission period for an exceptional time other than a time interval from the start time to the end time.

* * * * *